(12) United States Patent
Nakagawa et al.

(10) Patent No.: US 6,393,222 B1
(45) Date of Patent: May 21, 2002

(54) DIGITAL CAMERA AND METHOD OF CONTROLLING DISPLAY THEREOF

(75) Inventors: Yoshio Nakagawa, Sakai; Tatsuro Izumi, Hashimoto; Yoshiyuki Inoue, Izumi; Daigo Yoshioka, Toyonaka; Hisanori Itoh; Shoichi Minato, both of Sakai, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/695,670

(22) Filed: Oct. 24, 2000

(30) Foreign Application Priority Data

Oct. 26, 1999 (JP) .............................. 11-304210

(51) Int. Cl.[7] .......................... G03B 17/18; G03B 13/02
(52) U.S. Cl. ................... 396/287; 396/374; 348/333.06; 348/333.13
(58) Field of Search ................. 396/287, 373, 396/374, 383; 348/333, 333.01, 333.06, 333.13, 373, 375; 388/906, 909.1; 386/38, 118

(56) References Cited

U.S. PATENT DOCUMENTS 6,091,450 A * 7/2000 Hirasawa .................... 348/333

FOREIGN PATENT DOCUMENTS

JP  8-307738  11/1996

* cited by examiner

Primary Examiner—David M. Gray
Assistant Examiner—Rochelle Blackman
(74) Attorney, Agent, or Firm—Sidley Austin Brown & Wood LLP

(57) ABSTRACT

A digital camera comprises an electronic view finder (EVF) for electronically displaying an image of a subject and a movable monitor. The movable monitor is slidable along guide grooves and movable between a first position in which the EVF is covered with the movable monitor and a second position in which the EVF is not covered. By a sensor for position detection, when it is detected that the movable monitor is in the first position, no image is displayed on the EVF but an image is displayed on the movable monitor. When it is detected that the movable monitor is in the second position, no image is displayed on the movable monitor but an image is displayed on the EVF. Consequently, power can be saved, and when the movable monitor is in the first position, adhesion of dusts and dirt onto the display face of the EVF can be decreased.

13 Claims, 12 Drawing Sheets

F I G. 9A
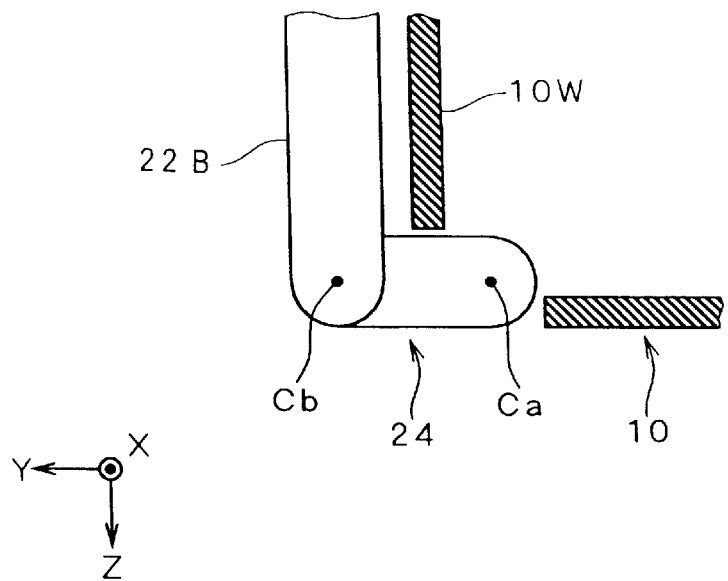
F I G. 9B
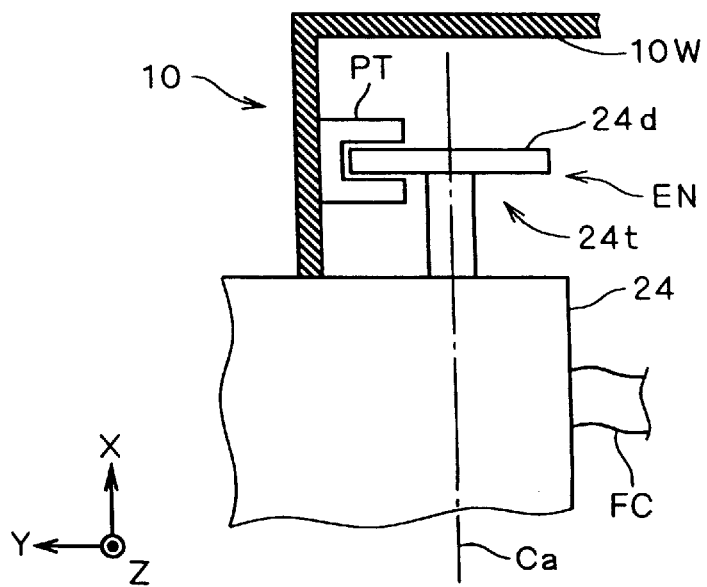

DIGITAL CAMERA AND METHOD OF CONTROLLING DISPLAY THEREOF

This application is based on application No. 11-304210 filed in Japan, the contents of which are hereby incorporated by reference.

BACKGROUND OF THE INVENTION

1. Field of the Invention

The present invention relates to a digital camera and, more particularly, to a digital camera having two display units capable of electronically displaying an image, for example, an electronic view finder and a monitor.

2. Description of the Background Art

Hitherto, a digital camera is known, which has two display units each capable of electronically displaying an image, such as an electronic view finder for electronically displaying an image of a subject in a real time manner in an image capturing mode, and a monitor for electronically displaying an image of the subject at the time of or after capturing the image.

In some digital cameras, only one of the electronic view finder and the monitor, which is selected at the time point is allowed to display a real-time image of the subject in the image capturing mode. The reasons why only one of the two electronic image display units is allowed to display an image are as follows.

(1) When both of the electronic image display units are allowed to display an image, the power consumption is high.

(2) The user hardly looks images simultaneously on the monitor and the electronic view finder. Even in the case where the user checks images of a subject on both units, the user usually looks the images on the electronic view finder and the monitor alternately. Consequently, there is not much merit in allowing both units to display images simultaneously.

On the other hand, a digital camera capable of housing a monitor which is movable in a housing position in the camera body is known. In the digital camera, when the monitor is housed, only an electronic view finder is used. When the monitor is not housed, both the electronic view finder and the monitor can be used for displaying images, and it is also possible to allow only the monitor to display an image.

In the former case, however, there is not much merit in allowing both of the two display units to display images as described above, and the power consumption is high.

In the latter case, although the power consumption is not a problem, even when an image is displayed only on the monitor, the user instinctively looks through the electronic view finder. This happens because of a subconscious awareness such that the user can always look a real-time image of a subject through a finder due to a habit formed in an optical finder. The following is also connected. In the case of the electronic view finder, different from the monitor, the user cannot check whether an image is displayed or not without actually looking the image through the finder.

As described above, such a conventional digital camera of a movable monitor type has a problem such that it is not constructed so as to produce a technical synergistic effect between the fact that the monitor is movable and the fact that the two display units are selectively used and allowed to display an image in order to save consumption power.

SUMMARY OF THE INVENTION

The present invention is directed to a digital camera.

According to the present invention, this digital camera comprises: a first display unit capable of electronically displaying an image; a second display unit capable of electronically displaying an image and movable among a plurality of positions including a first position in which at least a part of a display face of the first display unit is covered with the second display unit and a second position in which the display face of the first display unit is not covered with the second display unit; and a display controller which performs a first control of making the first display unit incapable of displaying an image when the second display unit is in the first position, and a second control of making the first display unit capable of displaying an image when the second display unit is in the second position.

By making the first display unit incapable of displaying an image when the second display unit is in the first position in which at least a part of the display face of the first display unit is covered with the second display unit, a power-thrifty digital camera is realized.

When the second display unit is in the first position, the display face of the first display unit is at least partly covered with the second display unit. Consequently, the user can easily understand that the first display unit is not used to display an image at the time point. The user does not therefore looks into the first display unit on which no image is displayed.

Further, in a state such that the digital camera is not in use, by setting the second display unit in the first position, effects such that adhesion of dusts and dirt onto the display face of the first display unit is decreased and the display performance is therefore maintained are produced.

In a preferred embodiment of the present invention, in the digital camera, the second control is a control of selectively making the first and second display units activated when the second display unit is in the second position. Since both of the display units are not made activated simultaneously when the second display unit is in the second position, it is particularly power thrifty.

In another aspect of the present invention, in the digital camera, the display controller comprises: a detecting element for detecting the position of the second display unit; and a switching element for switching the first control and the second control in accordance with whether the second display unit is in the first position or the second position. By the switching between the first and second controls, the operation of making the display unit incapable of displaying an image is automatically performed in association with the movement of the second display unit between the positions. The user therefore does not have to switch the control between the first and second controls.

The present invention is also directed to a method of controlling display of a digital camera comprising a first display unit and a second display unit which is movable between a first position in which the first display unit is covered with the second display unit and a second position in which the first display unit is not covered with the second display unit.

The "display face" in the present invention denotes an open face by which the user can look a displayed image and which can be brought physically close to the display image. For example, a display face in an electronic view finder corresponds to the face of an eyepiece of the electronic view finder.

It is therefore an object of the present invention to obtain a digital camera of a type that one of two electronic display units is operative, which achieves lower power consumption while ergonomically effectively utilizing the movability of one of the display units.

Another object of the present invention is to achieve both an ergonomic design and lower power consumption and make the most of the movability of one of the display units so as to produce other effects such as maintenance of the performance of the digital camera.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 9A and 9B are diagrams for explaining a swinging mechanism of the movable monitor 22B.

DESCRIPTION OF THE PREFERRED EMBODIMENTS

<First Embodiment>
<Configuration of Main Portion of Digital Camera>

Figure 1:
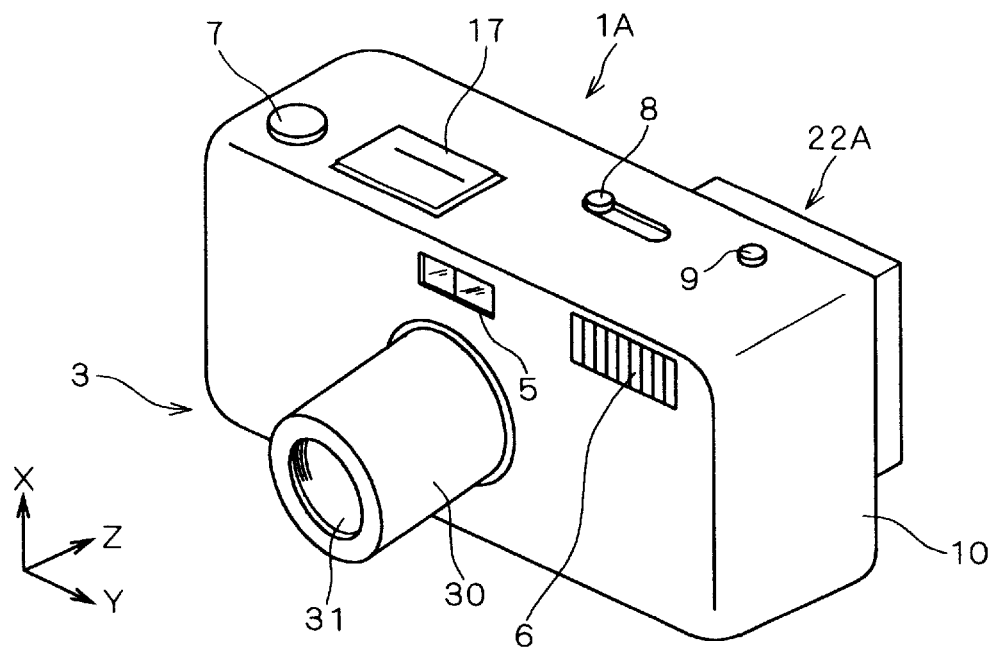
FIG. 1 is a perspective view showing the configuration of the main portion of a digital camera 1A according to a first embodiment of the invention.
Figure 2:
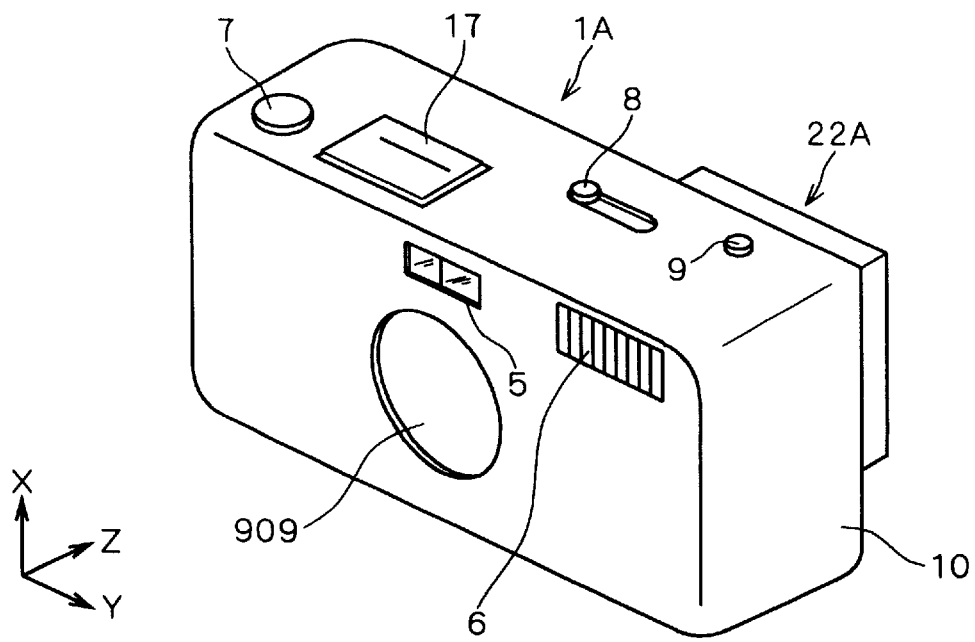
FIG. 2 is a perspective view showing the configuration of the main portion of the digital camera 1A.
Figure 3:
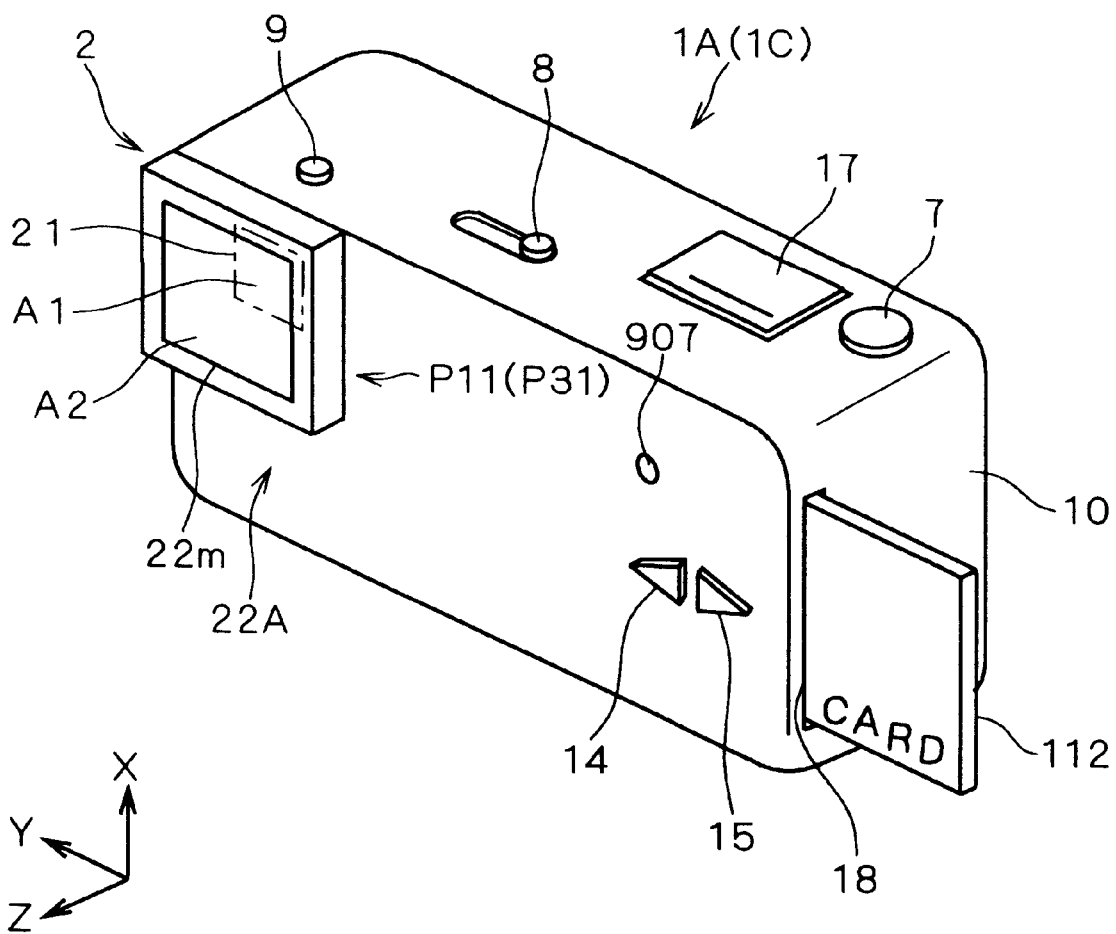
FIG. 3 is a perspective view showing the configuration of the main portion of the digital camera 1A.

FIGS. 1 through 3 are perspective views each showing the configuration of the main portion of a digital camera 1A according to a first embodiment of the present invention. FIG. 1 is a perspective view from the front side. FIG. 2 is a perspective view from the front side in a state where an image capturing optical unit is housed in the body of the camera. FIG. 3 is a perspective view from the back side. The digital camera 1A has a structure which is broadly divided into an image capturing optical unit 3 having an almost cylindrical shape and a camera body 10 having an almost rectangular parallelepiped shape.

The image capturing optical unit 3 has a lens 31 and a lens-barrel 30 for holding the lens 31. The lens-barrel 30 is constructed so as to project and retreat from/on the camera body 1. When the lens-barrel 30 is housed in the camera body 10, the lens 31 is covered with a lens barrier 909.

In the upper portion of the front of the camera body 10, an AF unit 5 for automatic focusing (hereinbelow, abbreviated as "AF") and a flash 6 are provided.

On the top face of the camera body 10, a release button 7, a mode switch 8, a self-timer shooting setting switch 9, and a display 17 are provided.

The release button 7 is an operating member such that when the release button 7 is half-pressed, a switch S1 is turned on (preparation for image capturing) and when the release button 7 is pressed all the way in, a switch S2 is turned on (release). The mode switch 8 switches the modes "OFF", "recording" and "reproduction". The self-timer shooting setting switch 9 switches the setting between normal shooting and self-timer shooting each time the switch 9 is pressed. The display 17 which takes the form of, for example, an LCD displays captured data, setting of self-timer shooting, a frame number at the time of shooting, and other set modes.

On one of the side faces of the camera body 10, a memory card slot 18 is provided. The memory card slot 18 is formed in a slit from which an external recording medium 112 (hereinbelow, called a "memory card") is inserted into the camera body 10.

The camera body 10 further comprises, on its rear face, zoom bottoms 14 and 15, a focus display lamp 907, and an image display unit 2.

When the zoom button 14 is pressed, the lens 30 is driven to the wide side. When the zoom button 15 is pressed, the lens 30 is driven to the tele-side. The zoom buttons 14 and 15 also function as access buttons for calling image data recorded in the memory card 112 at the time of reproduction. Recorded images are forward fed (UP) each time the zoom button 14 is pressed and are reversely fed (DOWN) each time the zoom button 15 is pressed.

The focus display lamp 907 is lit when the image capture preparing operation is finished in a state where the button 7 is half-pressed (the switch S1 which will be described hereinlater is ON). The focus display lamp 907 blinks when the subject is too close to capture an image or when the flash is being charged, thereby letting the user know about it.

The image display unit 2 has an electronic view finder (EVF) 21 functioning as a first display unit and a movable monitor 22A as a second image display unit.

The EVF21 electronically displays a real-time image of a subject at the time of shooting.

Figure 5A:
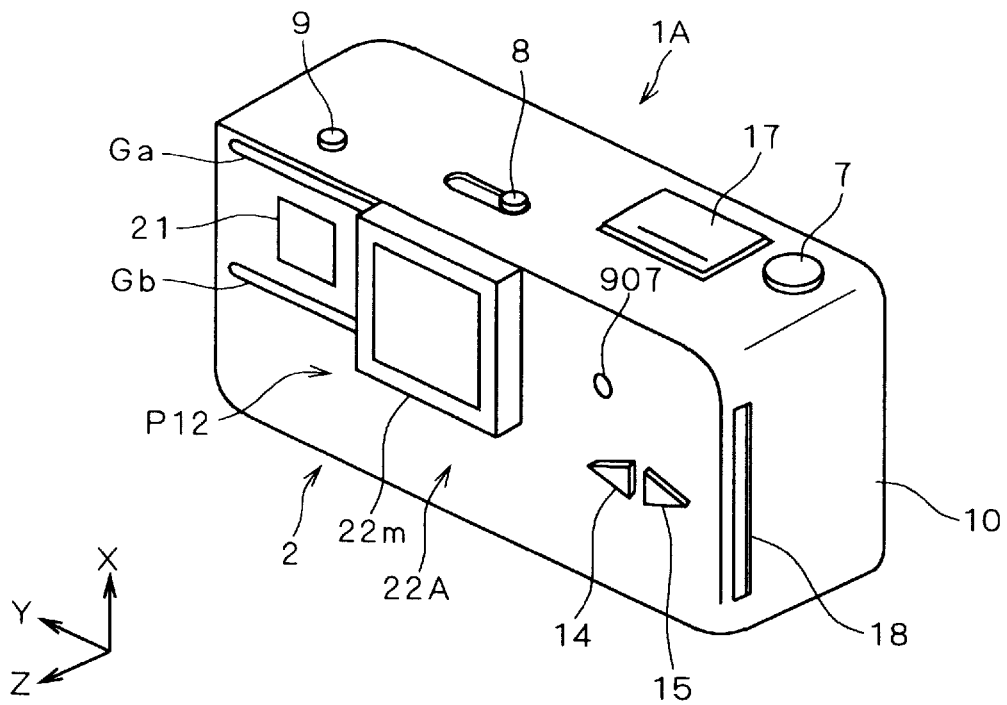
FIGS. 5A and 5B show that a movable monitor 22A is in a second position.

The movable monitor 22A is formed in an almost rectangular thick plate shape. The size of the principal plane A2 is larger than that of a display face A1 of the EVF 21. The movable monitor 22A has a liquid crystal display body (monitor body) 22m for image display and is constructed so as to be translatively movable between a first position P11 in which the display face A1 of the EVF 21 is covered with the movable monitor 22A as shown in FIG. 3 and a second position P12 in which the display face A1 of the EVF 21 is not covered but is exposed as shown in FIG. 5A which will be described hereinlater. Although not shown, in the movable monitor 22A, a back light, wires and the like necessary for displaying of the monitor body 22m are housed. The inherent display face of the EVF 21 exists deeper than the eyepiece of the EVF 21. When the user looks an image of a subject through the eyepiece of the EVF21, however, since the user looks the image in the range of the eyepiece, the surface of the eyepiece is regarded as a substantial display face in this case.

On the monitor body 22m, a captured image of a subject can be electronically reproduced and displayed and also, like the EVF 21, an image of the subject can be electronically displayed in a real-time manner in the image capturing mode.

Figure 4:
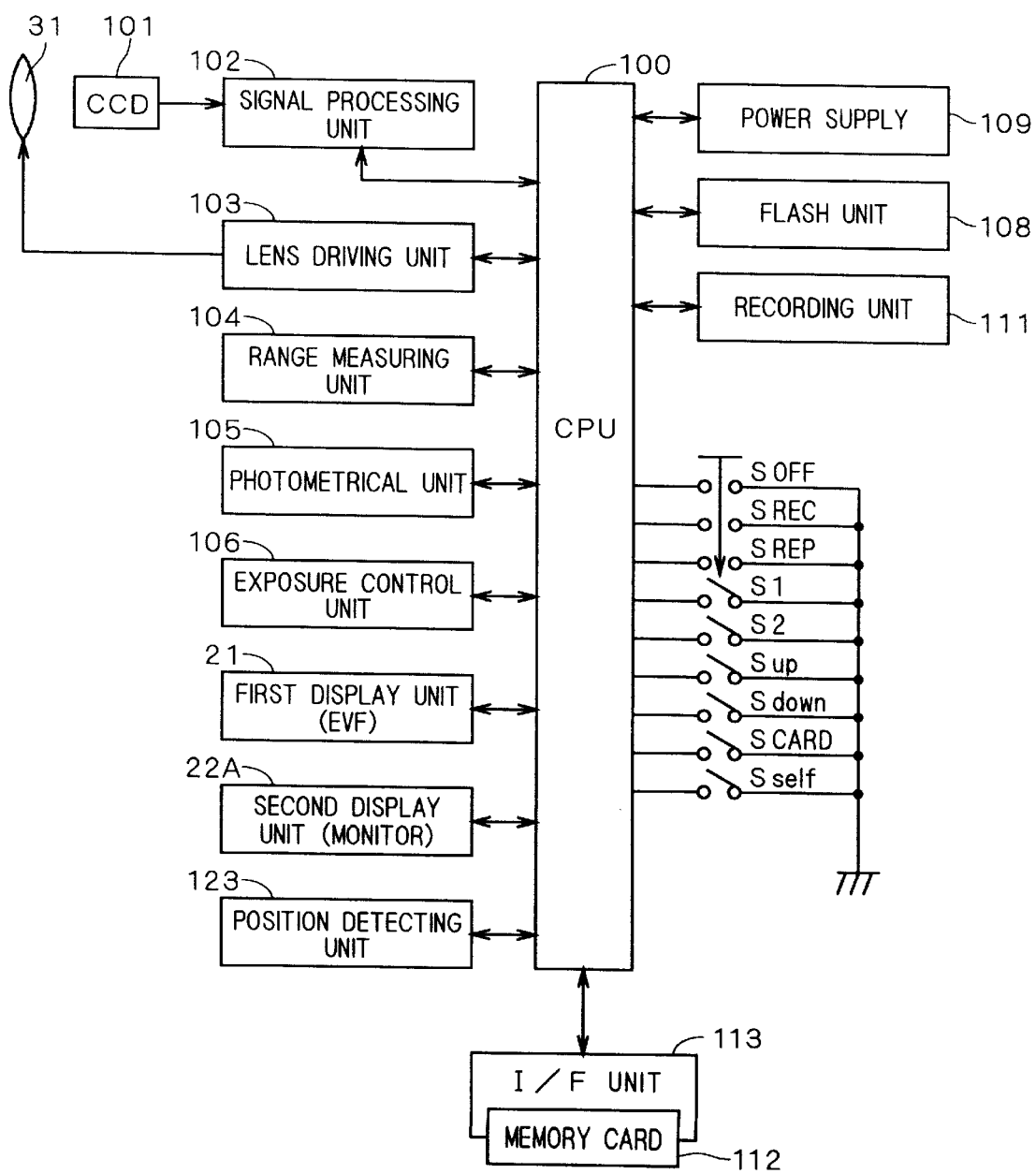
FIG. 4 is a block diagram showing the functional configuration of the digital camera 1A.

FIG. 4 is a block diagram showing a functional configuration of the digital camera 1A.

The digital camera 1A has a system controller (hereinbelow, called a CPU) 100 for controlling the operations of the whole camera. The CPU 100 performs various functions by executing predetermined software. Especially, the CPU 100 functions as a display controller which performs: a first control for making the EVF 21 as a first display unit incapable of displaying an image when the movable monitor 22A is in the first position P11; and a second control for making the EVF 21 as a first display unit capable of displaying an image when the movable monitor 22A is in the second position P12.

An image of a subject focused through the lens 31 is captured by a solid state image pickup device (hereinbelow, called a CCD) 101. An output image signal of the CCD 101 is processed by a signal processing unit 102. The lens 31 is driven by a lens driving unit 103 so that the focus is achieved on the basis of a range measurement result. A range measuring unit 104 measures the distance to the subject by using, for example, a phase difference detecting method or the like. An amount of driving the lens 31 by the lens driving unit 103 is calculated from the range measurement data. The lens driving unit 103 also makes the lens-barrel 30 for holding the lens 31 project or retreat and opens or closes the lens barrier 909. A photometrical unit 105 measures the brightness of the subject and outputs photometrical data to the CPU 100. An exposure control unit 106 receives data of exposure time (shutter speed) Tv and an aperture value Av sent from the CPU 100, which is obtained on the basis of the range measurement result and the photometrical result, and controls the exposure of the camera. A position detecting unit 123 detects the position of the movable monitor 22A which will be described in detail hereinlater.

A flash unit 108 is controlled by a boost control signal for charging and a light emission control signal which are sent from the CPU 100 and allows the flash 6 to flash.

A power supply 109 supplies power of a predetermined high voltage to the CCD 101 and power of a voltage at a predetermined level to the CPU 100 and each of other circuits.

A recording unit 111 is a data recording unit fixedly provided within the camera. At the time of capturing an image, captured image data subjected to a predetermined image process in the signal processing unit 102 is recorded in the recording unit 111.

The memory card 112 is a recording medium such as an SRAM which is removably inserted to the camera body 10. The memory card 112 can record data of a plurality of images. Data can be transferred between the memory card 112 and the CPU 100 via an I/F unit 113. In the case of transferring data to a personal computer or the like, the image data recorded in the recording unit 111 is once transferred to the memory card 112 and is read on the personal computer side.

The functions of switches SOFF to SSELF will be described hereinbelow one by one.

SOFF: A switch SOFF is turned on when the mode switch 8 is in the position of "OFF" to make the camera inoperative.

SREC: A switch SREC is turned on when the mode switch 8 is in the position of "recording" to make the camera recordable.

SREP: A switch SREP is turned on when the mode switch 8 is in the position of "reproduction" to make a recorded image reproducible on the movable monitor 22A.

S1: The switch S1 is turned on when the release start button 7 is pressed through one stage (half-depression) at the time of shooting to instruct preparation of capturing an image.

S2: The switch S2 is turned on when the release start button 7 is pressed through two stages (full depression) at the time of shooting to instruct exposure.

SUP: A switch SUP is turned on each time the access button 15 is pressed to perform forward reproduction of recorded images.

SDOWN: A switch SDOWN is turned on each time the access button 14 is pressed to perform reverse reproduction of recorded images.

SCARD: A switch SCARD is turned on while the memory card 112 is inserted.

SSELF: A switch SSELF is turned on when the mode is switched between regular shooting and self-timer shooting each time the self-timer shooting setting switch 9 is pressed.

<Positions of Movable Monitor 22A>

Figure 5B:
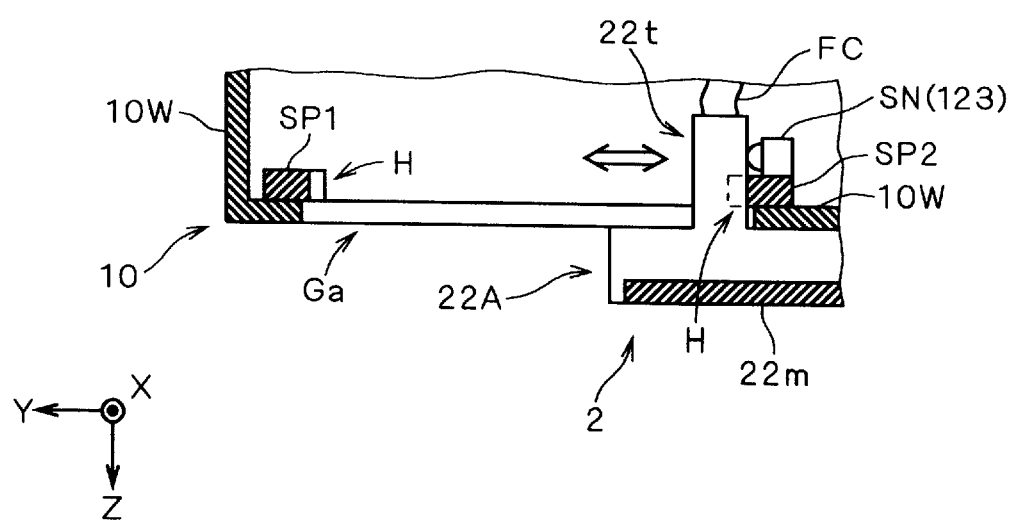

FIG. 3 which has already been explained shows a state where the movable monitor 22A is in the first position P11 in which the eyepiece of the EVF 21 is covered with the movable monitor 22A. FIGS. 5A and 5B show a state where the movable monitor 22A is in the second position P12. As shown in FIG. 5A, in the second position P12, the eyepiece of the EVF 21 is not covered with the movable monitor 22A but is exposed.

The digital camera 1A is provided with two guide grooves Ga and Gb which are parallel to each other and are provided almost in the horizontal direction on the back face of the camera body 10. The movable monitor 22A is slidable in the horizontal direction Y along the guide grooves Ga and Gb. The sliding mechanism will be described hereinbelow.

FIG. 5B is a cross section showing an YZ plane of the guide groove Ga for explaining the sliding function. The two directions are normal to the back face of the camera body 10.

The movable monitor 22A has a plate-shaped projection 22t having a thickness almost equal to the width of the guide groove Ga. When the projection 22t is fit in the guide groove Ga, the movement of the movable monitor 22A is restricted in the Y direction. In the projection 22t, a flexible cable FC for supplying power and a signal for displaying an image on the monitor body 22m is housed.

A casing 10w of the camera body 10 is provided with stoppers SP1 and SP2 for regulating the movement in the Y direction of the movable monitor 22A. Each of the stoppers SP1 and SP2 has a recess H. When the projection 22t of the movable monitor 22A fits in the recess H, the movable monitor 22A is half-fixed in the predetermined position (first position P1 or second position P12). On the stopper SP2, a sensor SN as a position detecting unit 123 in FIG. 4 is provided. By pressing the sensor SN with the projection 22t, the sensor SN is turned on. That is, the sensor SN can detect that the movable monitor 22A is in the second position P12.

<Operation of Digital Camera 1A>

The basic operation of the digital camera 1A having such a configuration will be described both from the viewpoint of operation of the user and from the viewpoint of control of the digital camera 1A. The basic operation from the viewpoint of operation of the user will be described first as follows.

The mode switch 8 is operated to make the digital camera 1A operative. The user arbitrarily selects either the EVF 21 or the movable monitor 22A to look a real-time image (view image) of a subject. In the case of looking a real-time image of the subject by using the EVF 21, the user manually moves the movable monitor 22A from the first position P11 in FIG.

3 to the second position P12 in FIG. 5A. When the movable monitor 22A is moved to the second position P12 in FIG. 5A, a real-time image display on the movable monitor 22A is erased by a control routine which will be described hereinlater, and a real-time image starts to be displayed on the EVF 21. The user looks the real-time image of the subject through the finder corresponding to the display face A1 of the EVF 21 (FIG. 3), adjusts the zoom magnification and framing, and captures an image of the subject by pressing the release button 7.

On the other hand, in the case of displaying a real-time image of the subject by using the movable monitor 22A, the user manually moves the movable monitor 22A from the second position P12 in FIG. 5A to the first position P11 in FIG. 3. When the movable monitor 22A is substantially apart from the second position P12 in FIG. 5A, a real-time image starts to be displayed on the movable monitor 22A and the real-time image on the EVF 21 is erased. The user looks the real-time image of the subject displayed on the movable monitor 22A, adjusts the zoom magnification and framing, and captures an image of the subject by pressing the release button 7.

A routine for controlling the series of operations on the digital camera 1A side is as follows.

Figure 6:
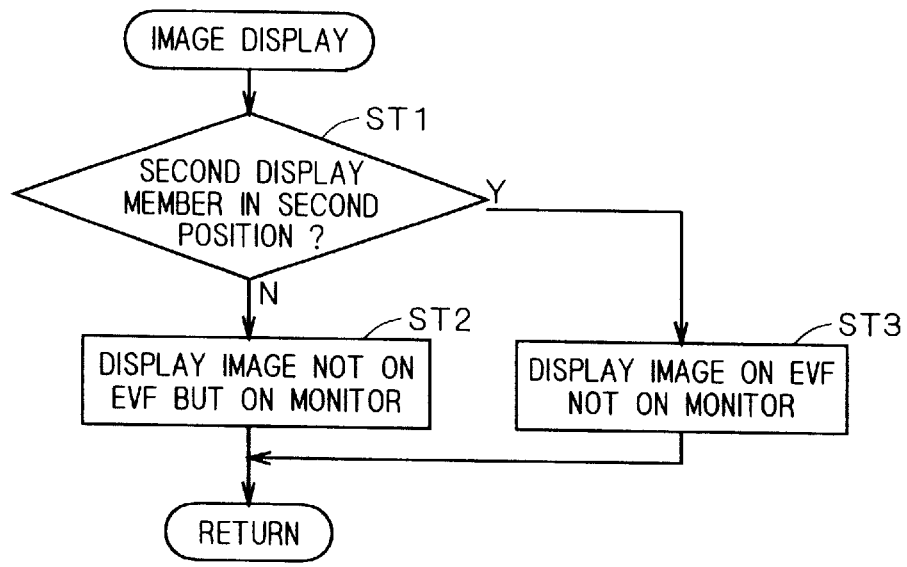
FIG. 6 is a flowchart for explaining the operation of displaying an image of a subject.

FIG. 6 is a flowchart for explaining an operation of displaying an image of a subject. The control of the image display is automatically executed by the CPU 100.

First, in step ST1, whether the movable monitor 22A is in the second position P12 or not is determined. That is, whether or not the sensor SN is pressed by the projection 22t of the movable monitor 22A and is in the ON state is determined. When the movable monitor 22A is not in the second position P12, the routine advances to step ST2. When the movable monitor 22A is in the second position P12, the routine advances to step ST3.

In step ST2, since the movable monitor 22A is in the first position P11 and the EVF 21 is covered with the movable monitor 22A, no image is displayed on the EVF 21 but an image of the subject is displayed on the monitor 22.

In step ST3, since the movable monitor 22A is in the second position and the monitor body 22m is exposed, an image of the subject is displayed on the EVF 21 and, on the other hand, no image is displayed on the monitor 22A.

By the operations, when the movable monitor 22A is in the first position P11 in which the display face of the EVF 21 is covered with the movable monitor 22A, by displaying no image on the EVF 21, a power-thrifty digital camera can be achieved. When the movable monitor 22A is in the second position P12, a real-time image of the subject can be looked only by the EVF 21 and a moving picture is not displayed on the movable monitor 22A. From this point as well, the power can be saved.

When the movable monitor 22A is in the first position P11, since the display face A1 of the EVF 21 is covered with the movable monitor 22A, the user can easily understand that the EVF 21 is not used for display at that time point. The user does not therefore look into the EVF 21 on which no image is displayed.

Further, in a state such that the digital camera 1A is not used, by setting the movable monitor 22A in the first position P11, adhesion of dusts and dirt onto the eyepiece corresponding to the display face A1 of the EVF21 can be decreased.

<Second Embodiment>
<Configuration of Main Portion of Digital Camera>

The configuration of a digital camera according to a second embodiment of the invention is similar to that of the digital camera 1A of the first embodiment except for the configuration of an image display section.

Figure 7:
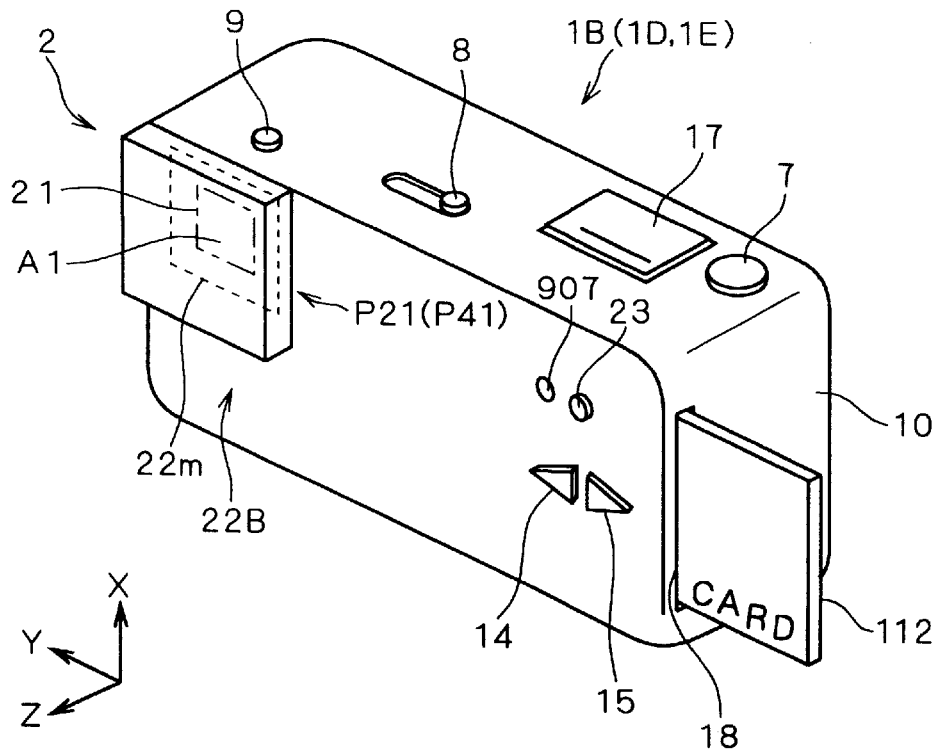
FIG. 7 is a perspective view showing the back face of a digital camera 1B according to a second embodiment.

FIG. 7 is a perspective view showing the back face of a digital camera 1B according to the second embodiment. In FIG. 7, the movable monitor 22B is in the first position P21. The movable monitor 22B is provided with the monitor body 22m (shown by imaginary lines) so as to face the display face A1 of the EVF 21. The digital camera 1B is provided with a switch button 23 functioning as operation input device (designating device) for selecting either the EVF 21 or the monitor 22m to display an image.

With the configuration of the image display section, the state where the movable monitor 22B is in the second position P22 is different from the state where the movable monitor 22B is in the second position P12 in the first embodiment (refer to FIGS. 5A and 5B).

Figure 8:
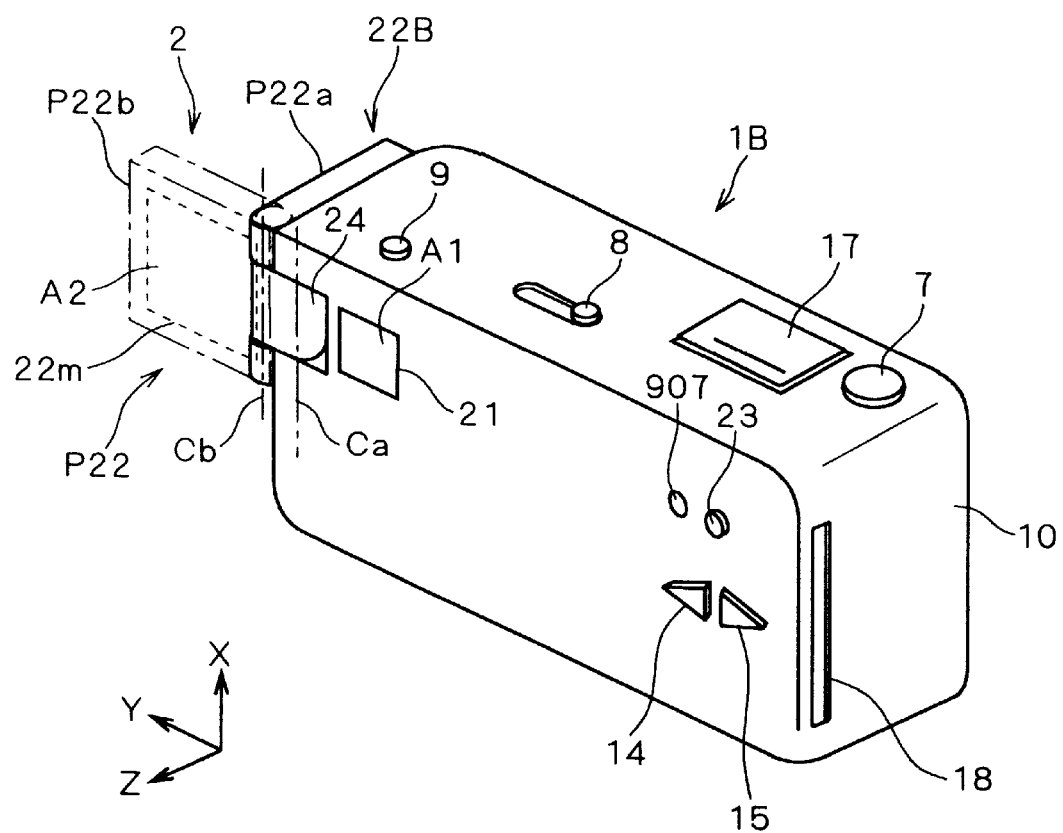
FIG. 8 shows that a movable monitor 22B is in a second position.

FIG. 8 is a diagram showing a state where the movable monitor 22B is in the second position P22. As shown in FIG. 8, the digital camera 1B has an arm 24 which supports the movable monitor 22B in an end portion of the back face of the camera body 10.

The arm 24 is swingable around a vertical swing shaft Ca in the camera body 10 as a center. The arm 24 is also swingable around a vertical swing shaft Cb in the movable monitor 22B by a hinge mechanism (refer to FIG. 9A). By the mechanism having the two swing shafts Ca and Cb, the movable monitor 22B can be set in the second position P22 including: a position P22a in which the display face A1 of the movable monitor 22B closely faces a side face of the camera body 10; and a position P22b (shown by imaginary lines) in which the movable monitor 22B is in parallel with the back face of the camera body 10. In the second position P22 of the movable monitor 22B, both the display faces A1 and A2 of the EVF 21 and the monitor body 22m are exposed to the outside.

FIG. 9B is a cross section of an XY plane for explaining a position detecting mechanism of the movable monitor 22B.

The arm 24 has a projection 24t which projects along the swing shaft Ca. The projection 24t has a disc 24d. A plurality of slits are provided in the radial direction of the disc 24d. The casing 10w of the camera body 10 is provided with an optical sensor PT having a light emitting device and a light receiving device. The combination of the disc 24d and the optical sensor PT functions as an encoder EN so that the rotation angle of the arm 24, that is, the movable monitor 22B in the swing shaft Ca can be detected. For convenience, it is now assumed that the angle detected by the encoder EN when the movable monitor 22B is in the first position P21 (refer to FIG. 7) is 0 degree and the angle detected by the encoder EN when the movable monitor 22B is in the second position P22 (refer to FIG. 8) is 90 degrees. The flexible cable FC for supplying power and signals for displaying an image on the monitor 22 is housed in the arm 24.

<Operation of Digital Camera 1B>

Figure 10:
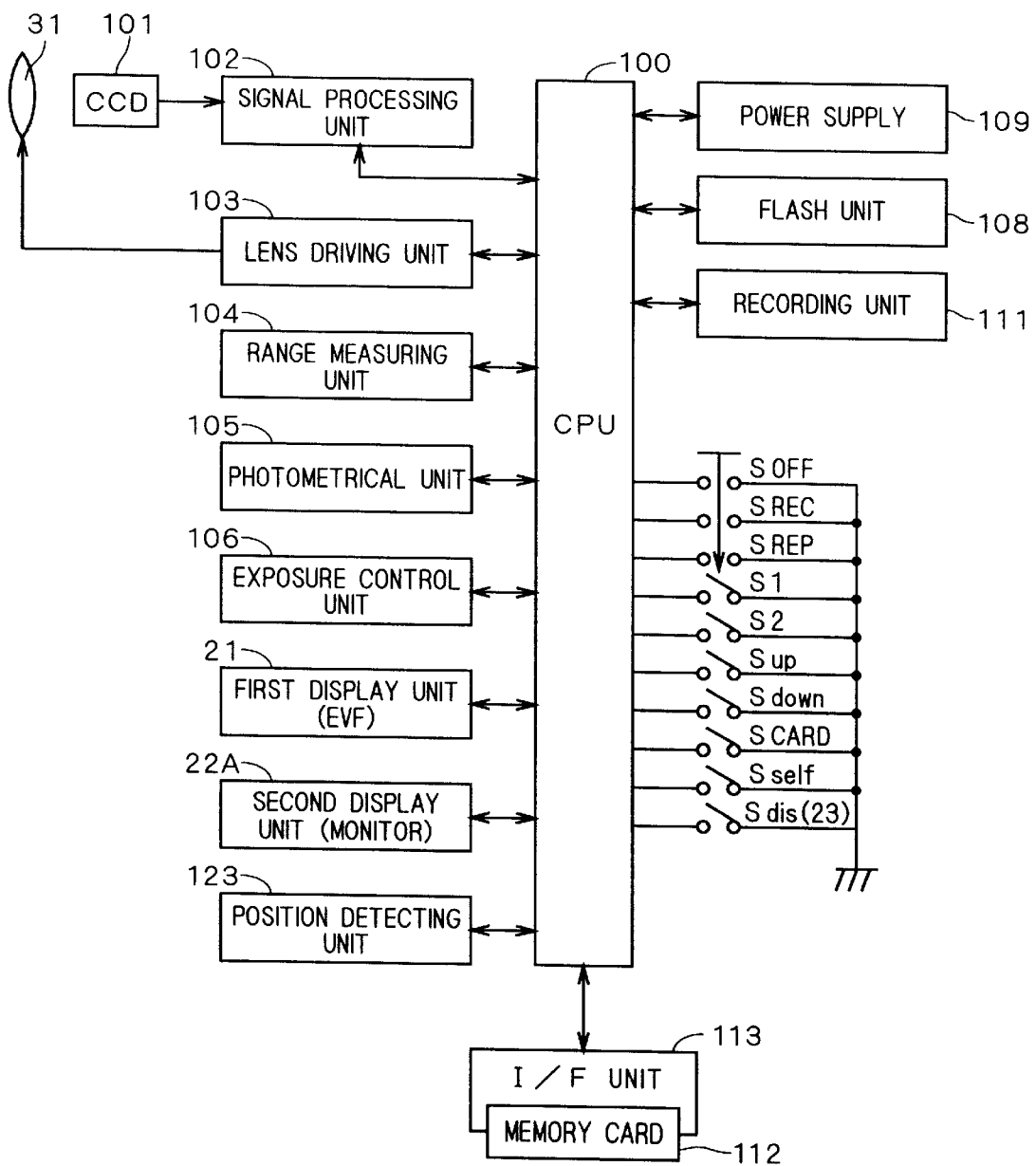
FIG. 10 is a block diagram showing a functional configuration of the digital camera 1B.

The basic operation of the digital camera 1B having such a configuration is substantially the same as that of the digital camera 1A of the first embodiment except for the operation of displaying an image of a subject. FIG. 10 is a block diagram of the digital camera 1B. The digital camera 1B is different from that of FIG. 4 with respect to the point that a switch Sdis which is turned on by the depression of the switch button 23 (FIG. 7) to be described hereinlater is added.

Figure 11:
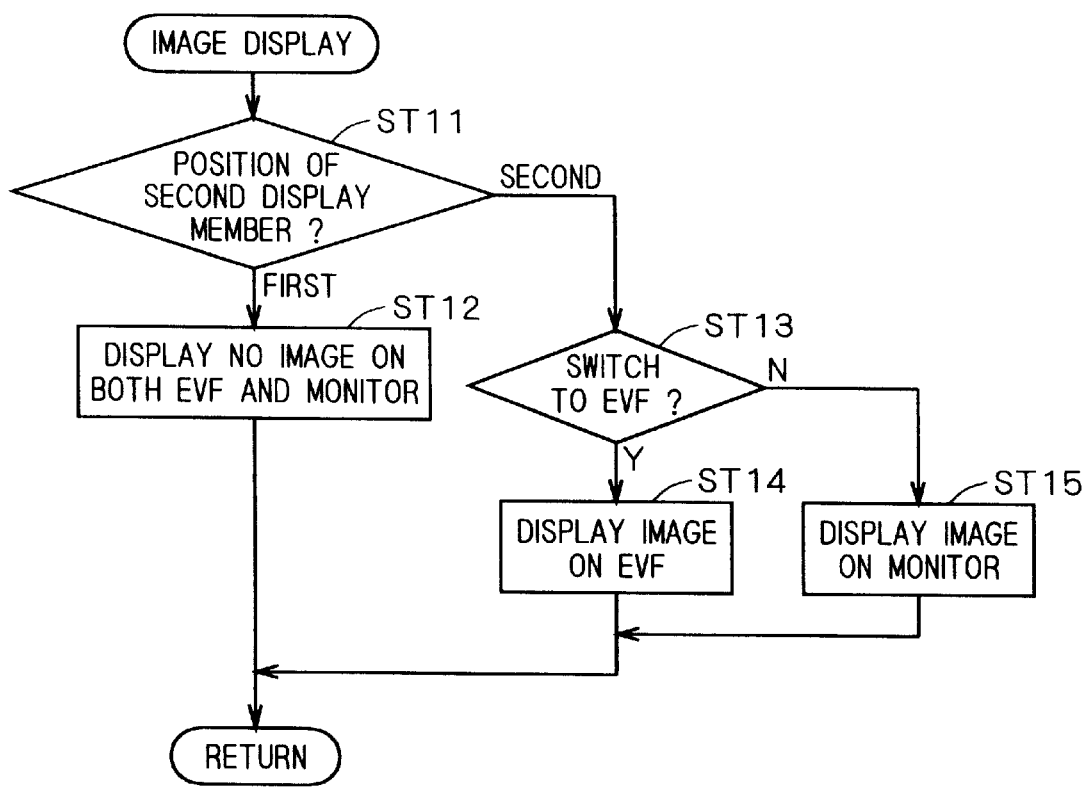
FIG. 11 is a flowchart for explaining the operation of displaying an image of a subject.

FIG. 11 is a flowchart for explaining the operation of displaying an image of a subject in the digital camera 1B.

In step ST11, whether the movable monitor 22B is in the first position P21 or the second position P12 is determined.

That is, whether the swing angle of the arm 24 (movable monitor 22B) is 0 or 90 degrees is determined by the encoder EN. The angles of the arm 24 is not limited to the two values of 0 degree and 90 degrees but lie in a range from 0 to 90 degrees when the arm 24 has an intermediate posture between the first and second positions P21 and P22. Consequently, for example, the following manner is possible. 45 degrees is used as a threshold, an angle from 0 to 45 degrees is regarded as 0 degree, and an angle from 45 to 90 degrees is regarded as 90 degrees. It is also possible to regard most angles as 90 degrees except for angles which can be substantially regarded as 0 degree within an angle detection error of the encoder EN. In the case where the movable monitor 22B is in the first position P21, the routine advances to step ST12. When it is in the second position P22, the routine advances to step ST13.

In step ST12, the movable monitor 22B is in the first position P21. Since the display face A1 of the EVF 21 is covered with the movable monitor 22B and the display faces A1 and A2 of the EVF 21 and the monitor body 22m are not exposed to the outside, no image is displayed on both the EVF 21 and the monitor body 22m.

In step ST13, whether or not the switch button 23 is pressed by the user to display an image on the EVF 21 is determined. When it is instructed by the depression of the switch button 23 to switch to the EVF 21, an image is displayed on the EVF 21 and no image is displayed on the movable monitor 22B (step ST14). On the other hand, when the switch button 23 is not pressed and the mode is not switched to the EVF 21, an image is displayed on the monitor body 22m and no image is displayed on the EVF 21 (step ST15).

By the above operations, when the movable monitor 22B is in the second position P22 in which the display face of the EVF 21 is not covered, the display mode can be switched between the EVF 21 and the monitor body 22m by the switch button 23. Consequently, a power-thrifty digital camera can be realized.

In a state such that the digital camera 1B is not in use, by setting the movable monitor 22B in the first position P21, adhesion of dusts or dirt onto the display faces A1 and A2 of the EVF 21 and the movable monitor 22B can be decreased.

Further, in the position P22a, the movable monitor 22B is in close contact with a side face of the camera body 10. In the case of displaying an image on the display face A1 of the EVF 21, the movable monitor 22B does not hinder the operation of looking an image into the finder.

<Third Embodiment>
<Configuration of Main Portion of Digital Camera>

A digital camera according to a third embodiment of the present invention has a configuration similar to that of the digital camera 1B of the second embodiment except for, mainly, the configuration of the image display unit 2.

Figure 12:
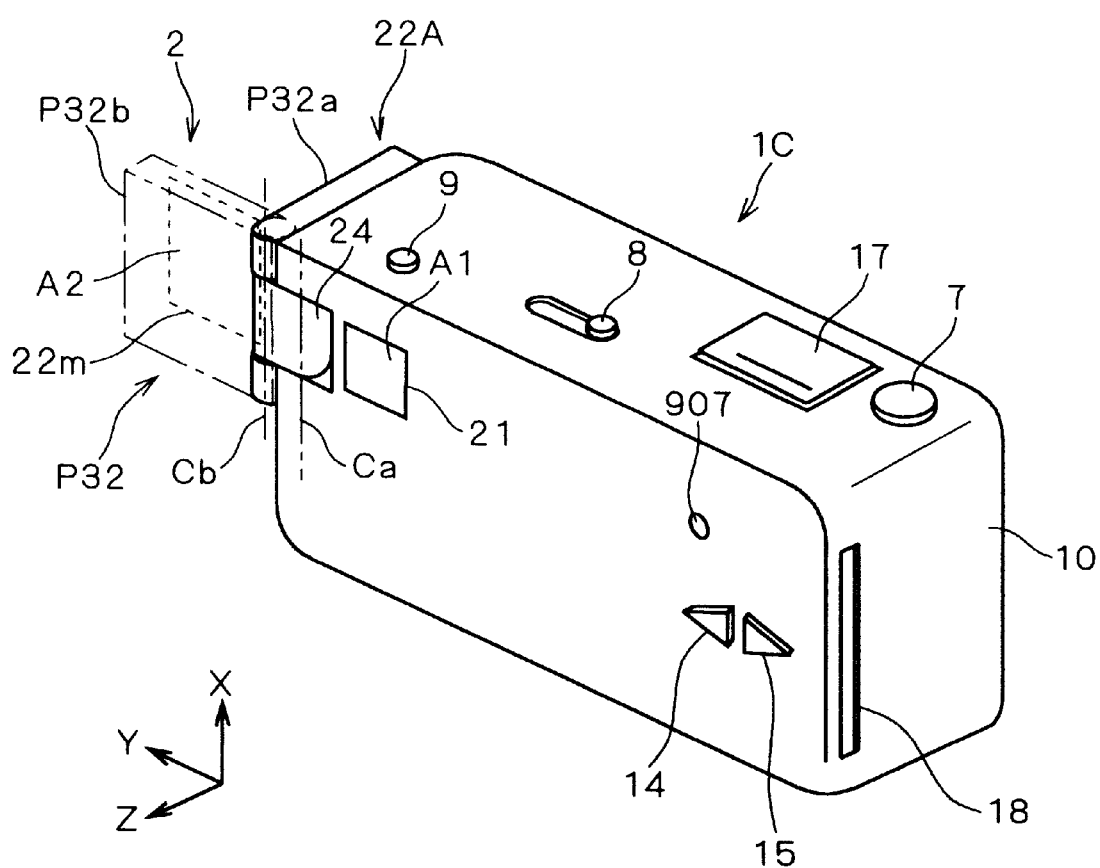
FIG. 12 shows that the movable monitor 22A according to a third embodiment is in a second position.

FIG. 12 shows that the movable monitor 22A in the third embodiment is in a second position P32. A first position P31 of the movable monitor 22A is different from that in the second embodiment but is similar to the first position P11 in which the display face A2 of the monitor body 22m is exposed as in the first embodiment shown in FIG. 3. Since a digital camera 1C is provided with an arm 24 having two joints in a manner similar to the second embodiment, the movable monitor 22A can be set in the second position P32 including: a position P32a in which the display face A1 of the movable monitor 22A is adjacent to and faces a side face of the camera body 10; and a position P32b (shown by imaginary lines) in which the movable monitor 22A is in parallel with the back face of the camera body 10. In the second position P32 of the movable monitor 22A, the display face A2 of the monitor body 22m cannot be seen from the rear side of the digital camera 1C. Consequently, it is unnecessary for the user to switch the display between the display faces A1 and A2, so that the switch button 23 in the second embodiment is unnecessary.

The block diagram of the digital camera 1C is similar to FIG. 4. The operation of displaying an image of a subject by the digital camera 1C having such a configuration is similar to the flowchart of FIG. 6.

When the movable monitor 22A is in the first position P31 in which the display face of the EVF 21 is covered with the movable monitor 22A, by not displaying an image on the EVF 21, a power-thrifty digital camera can be realized.

When the movable monitor 22A is in the first position P31, the display face A1 of the EVF 21 is covered with the movable monitor 22A. Consequently, the user can easily understand that the EVF 21 is not used for displaying an image at the time point. The user does not therefore try to look an image into the EVF 21 on which no image is displayed.

Further, in a state such that the digital camera 1C is not in use, by setting the movable monitor 22A in the first position P31, adhesion of dusts and dirt onto the eyepiece corresponding to the display face A1 of the EVF 21 can be decreased. Since the display face of the second display member faces the camera body when the movable monitor 22A is in the second position, adhesion of dusts and dirt onto the display face A2 of the monitor body 22m can be decreased.

<Fourth Embodiment>
<Configuration of Main Portion of Digital Camera>

A digital camera according to a fourth embodiment of the present invention has a configuration similar to that of the digital camera 1B of the second embodiment but only the swinging direction of a movable monitor 22B and the state in the second position are different from those of FIG. 8.

Figure 13:
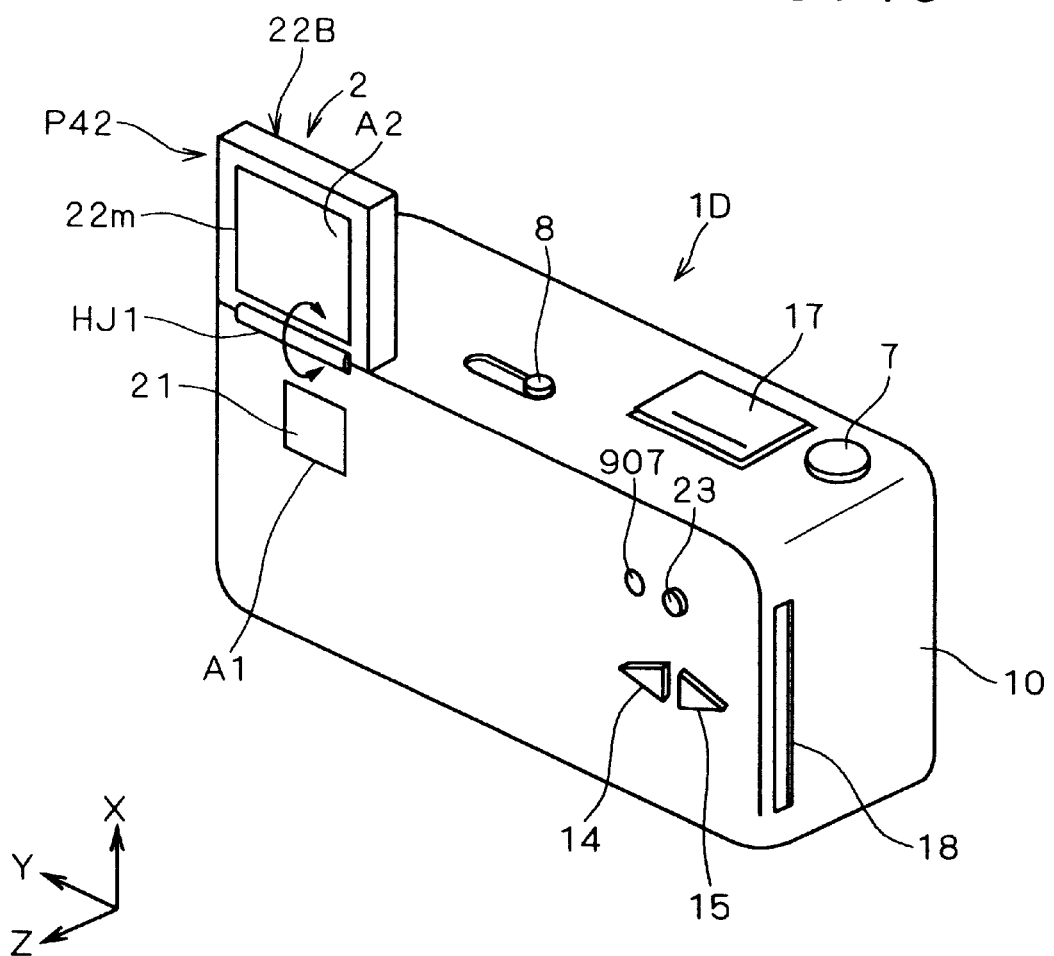
FIG. 13 shows that a movable monitor 22B according to a fourth embodiment is in a second position.

FIG. 13 shows that the movable monitor 22B in the fourth embodiment is in a second position P42. A first position P41 is similar to the first position P21 of the second embodiment as shown in FIG. 7. A digital camera 1D has a hinge HJ1 having a swing shaft parallel to the Y axis. The movable monitor 22B is swingable around the hinge HJ1 as a center with respect to the camera body 10. In a manner similar to the digital camera 1B of the second embodiment, the digital camera 1D has a detecting mechanism for detecting the swing angle of the movable monitor 22B. A flexible cable for supplying power and signals for displaying an image on the monitor body 22m is disposed in the hinge HJ1.

The block diagram of the digital camera 1D is similar to FIG. 4. The operation of displaying an image of a subject of the digital camera 1D having such a configuration is similar to the flowchart shown in FIG. 11.

When the movable monitor 22B is in the second position P42 in which the display face of the EVF 21 is not covered, the display can be switched between the EVF 21 and the monitor body 22m by the switch button 23. Consequently, a power-thrifty digital camera can be achieved.

By setting the movable monitor 22B in the first position P41 in a state such that the digital camera is not in use, adhesion of dusts and dirt onto the display faces A1 and A2 of the EVF 21 and the monitor body 22m can be decreased.

Further, in the fourth embodiment, a single hinge is used in place of the arm having two joints in the digital camera 1B in the second embodiment. The configuration of the digital camera can be therefore simplified.

Figure 14:
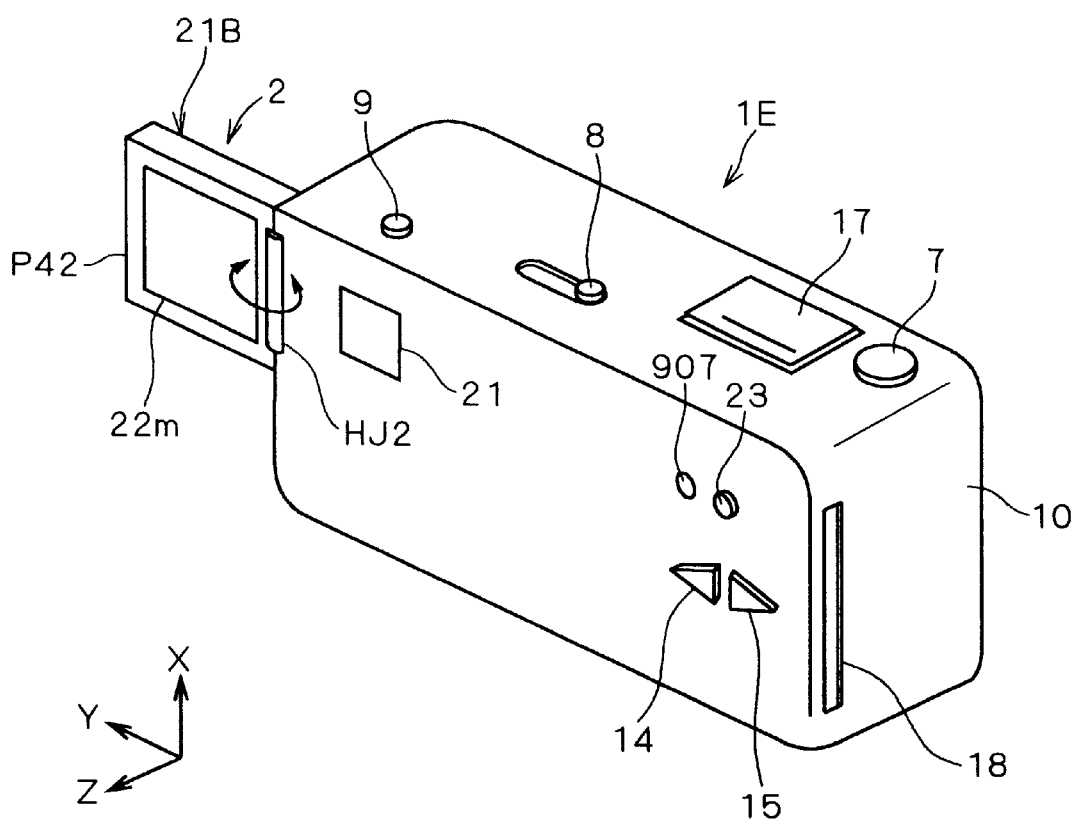
FIG. 14 shows that the movable monitor 22B is in a second position.

A digital camera 1E comprising a hinge HJ2 having a vertical swing shaft which is parallel to the X axis as shown in FIG. 14 can also produce effects similar to those of the digital camera 1D of the fourth embodiment. The other configuration and operations of the example of FIG. 14 are similar to those of the digital camera 1B of FIG. 8.

<Modifications>

In the digital camera 1A of the first embodiment, another sensor for sensing the first position P11 of the movable monitor 22A may be provided. In this case, the first position P11 of the movable monitor 22A can be more certainly detected.

It is not indispensable to use an encoder to detect the positions of the movable monitors 22B to 22E in the second to fourth embodiment but a sensor may be employed.

Although the display face A1 of the EVF 21 is completely covered with the movable monitor 22A or 22B in each of the first positions P11 to P41 in the foregoing embodiments, only a part of the display face A1 of the EVF 21 may be covered with the movable monitor 22A or 22B in each of the first positions P11 to P41.

In this case as well, since the user cannot substantially look into the EVF 21, the user can know at the time point that no image is displayed on the EVF 21.

The following configuration is also possible. When the movable monitors 22A and 22B are in the second positions P12 to P42, by receiving an exceptional operational input of the user, both of the movable monitor 22A or 22B and the EVF 21 are allowed to display an image. Specifically, although it is preferable from the viewpoint of saving power that only one of them is allowed to display an image, it is not prohibited to add an exception mode of allowing both of them to display an image upon receipt of an exceptional request from the user.

The first and second display units in the present invention are not limited to an EVF and a liquid crystal monitor. Due to the configuration that the display face of the first display unit is covered with the second display unit, the present invention is mainly applied to the case where the second display unit is larger than the first display unit. Generally, however, the present invention can be applied to a digital camera comprising first and second display units having different display modes such as not only display units of different sizes but also an eyepiece-type display unit such as an EVF and a display unit such as a liquid crystal monitor which can be looked away from it, and a monochrome display unit and a color display unit.

While the invention has been described in detail, the foregoing description is in all aspects illustrative and not restrictive. It is understood that numerous other modifications and variations can be devised without departing from the scope of the invention.

What is claimed is:

1. A digital camera comprising:

(a) a first display unit capable of electronically displaying an image;

(b) a second display unit capable of electronically displaying an image and movable among a plurality of positions including a first position in which at least a part of a display face of said first display unit is covered with said second display unit and a second position in which the display face of said first display unit is not covered with said second display unit; and (c) a display controller which performs a first control of making said first display unit incapable of displaying an image when said second display unit is in said first position, and a second control of making said first display unit capable of displaying an image when said second display unit is in said second position.

2. The digital camera according to claim 1, wherein said second control is a control of selectively making said first display unit and said second display unit activated when said second display unit is in said second position.

3. The digital camera according to claim 1, wherein said display controller comprises:

(c-1) a detecting element for detecting the position of said second display unit; and (c-2) a switching element for switching said first control and said second control in accordance with whether said second display unit is in said first position or said second position.

4. The digital camera according to claim 1, wherein said second display unit is slidably movable between said first position and said second position, and the display face of said second display unit is exposed in both said first position and said second position.

5. The digital camera according to claim 1, wherein said second display unit is swingable between said first position and said second position.

6. The digital camera according to claim 5, wherein the display face of said second display unit faces the display face of said first display unit in said first position, and the display face of said second display unit is exposed to the outside in said second position.

7. The digital camera according to claim 6, wherein said second display unit is larger than said first display unit and the display face of said first display unit is almost completely covered with said second display unit in said first position.

8. The digital camera according to claim 5, wherein the display face of said second display unit is exposed in said first position, and the display face of said second display unit closely faces the camera body in said second position.

9. The digital camera according to claim 1, wherein said display controller further comprises:

(c-3) an operation input device for receiving an operation input for selecting either said first display unit or said second display unit to display a real-time image of a subject in said second position.

10. The digital camera according to claim 1, wherein said second display unit is larger than said first display unit and the display face of said first display unit is almost completely covered with said second display unit in said first position.

11. A method of controlling display of a digital camera comprising a first display unit and a second display unit which is movable between a first position in which said first display unit is covered with said second display unit and a second position in which said first display unit is not covered with said second display unit, the method comprising the steps of:

detecting a position of said second display unit; and making said first display unit incapable of displaying an image when said second display unit is in the first position.

12. The method according to claim 11, wherein when said second display unit is in the second position, a captured image is displayed on said first display unit.

13. The method according to claim 11, further comprising the steps of:

detecting a setting state by a designating device for designating a display unit; and displaying a captured image on the display unit designated by said designating device when said second display is in the second position.

* * * * *

UNITED STATES PATENT AND TRADEMARK OFFICE
CERTIFICATE OF CORRECTION

PATENT NO.   : 6,393,222 B1                              Page 1 of 1
DATED        : January 15, 2003
INVENTOR(S)  : Yoshio Nakagawa et al.

It is certified that error appears in the above-identified patent and that said Letters Patent is hereby corrected as shown below:

Column 11,
Line 64, delete "The", and insert -- A --.

Column 12,
Lines 1, 10, 15, 18, 23, 28, 34, 40, 56 and 59, delete "The", and insert -- A --.
Line 3, delete "(c-1)".
Line 6, delete "(c-2)".
Lines 24 and 41, after "unit", insert -- , --.
Line 36, delete "(c-3)".
Line 65, after "display", insert -- unit --.

Signed and Sealed this

Twenty-ninth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,393,222 B1  Page 1 of 1
DATED : May 21, 2002
INVENTOR(S) : Yoshio Nakagawa et al.

It is certified that error appears in the above-identified patent and that said Letters Patent is hereby corrected as shown below:

Column 11,
Line 64, delete "The", and insert -- A --.

Column 12,
Lines 1, 10, 15, 18, 23, 28, 34, 40, 56 and 59, delete "The", and insert -- A --.
Line 3, delete "(c-1)".
Line 6, delete "(c-2)".
Lines 24 and 41, after "unit", insert -- , --.
Line 36, delete "(c-3)".
Line 65, after "display", insert -- unit --.

This certificate supersedes Certificate of Correction issued April 29, 2003.

Signed and Sealed this

Second Day of December, 2003

JAMES E. ROGAN
*Director of the United States Patent and Trademark Office*